United States Patent
Morgan

(10) Patent No.: US 9,657,826 B1
(45) Date of Patent: May 23, 2017

(54) ELECTRIC MOTOR WITH COAXIAL CLUTCH PACKS THAT PROVIDE DIFFERENTIAL AND TORQUE VECTORING

(71) Applicant: BorgWarner Inc., Auburn Hills, MI (US)

(72) Inventor: Thomas Morgan, Farmington Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/238,840

(22) Filed: Aug. 17, 2016

(51) Int. Cl.
| | | |
|---|---|---|
| *F16H 48/10* | (2012.01) | |
| *B60K 17/16* | (2006.01) | |
| *B60K 23/08* | (2006.01) | |
| *F16H 48/22* | (2006.01) | |
| *B60K 23/04* | (2006.01) | |

(52) U.S. Cl.
CPC ............ *F16H 48/22* (2013.01); *B60K 17/16* (2013.01); *B60K 23/0808* (2013.01); *F16H 48/10* (2013.01); *B60K 2023/043* (2013.01); *F16H 2048/104* (2013.01); *F16H 2048/106* (2013.01)

(58) Field of Classification Search
CPC .... B60K 17/165; B60K 17/046; B60K 23/08; B60K 7/0007; B60K 200/001; B60K 2007/0038; B60K 2007/0061; B60K 2007/0092; B60K 2023/043; F16H 48/10; F16H 48/22
See application file for complete search history.

(56) References Cited

U.S. PATENT DOCUMENTS

| | | | | |
|---|---|---|---|---|
| 4,681,180 A | * | 7/1987 | Oyama | B60K 23/04 180/248 |
| 5,396,968 A | * | 3/1995 | Hasebe | B60K 1/02 180/233 |
| 6,749,532 B2 | * | 6/2004 | Wachauer | B60K 1/00 180/65.6 |
| 7,276,005 B2 | * | 10/2007 | Morikawa | B60K 17/046 180/65.6 |
| 7,410,017 B2 | * | 8/2008 | Gradu | B60K 17/046 180/375 |
| 8,343,000 B2 | * | 1/2013 | Karlsson | B60L 15/20 180/65.6 |
| 8,419,588 B2 | | 4/2013 | Palfai et al. | |
| 8,430,776 B2 | | 4/2013 | Palfai et al. | |
| 8,449,429 B2 | | 5/2013 | Palfai et al. | |
| 8,544,151 B2 | | 10/2013 | Courbon et al. | |
| 8,633,622 B2 | | 1/2014 | Chamberlin et al. | |
| 8,672,070 B2 | | 3/2014 | Palfai et al. | |
| 8,761,982 B2 | * | 6/2014 | Yamamoto | B60K 6/52 180/65.285 |

(Continued)

*Primary Examiner* — Derek D Knight
*Assistant Examiner* — David Morris
(74) *Attorney, Agent, or Firm* — Miller, Matthias & Hull LLP

(57) ABSTRACT

An electric drive system for a vehicle includes an electric motor with a stator disposed circumferentially around a rotor. The rotor connects to a support frame that extends radially inwards to couple the rotor to a first planetary gear assembly and a second planetary gear assembly. The stator, rotor and the first and second planetary gear assemblies are disposed within a stationary housing. The first and second planetary gear assemblies couple to first and second clutch packs respectively, that are disposed outside of the stationary housing.

15 Claims, 2 Drawing Sheets

(56) References Cited

U.S. PATENT DOCUMENTS

| | | | |
|---|---|---|---|
| 8,771,123 B2 | 7/2014 | Palfai et al. | |
| 8,944,950 B2 * | 2/2015 | Holmes | B60W 30/045 475/150 |
| 9,371,810 B2 | 6/2016 | Creviston | |
| 2009/0242289 A1 * | 10/2009 | Murty | B60K 6/52 180/65.265 |
| 2010/0240485 A1 * | 9/2010 | Strasser | B60K 6/387 475/150 |
| 2012/0031926 A1 | 2/2012 | Bertoli et al. | |
| 2013/0190126 A1 | 7/2013 | Braford, Jr. | |
| 2014/0058643 A1 * | 2/2014 | Kodama | G06F 17/00 701/82 |
| 2015/0065283 A1 | 3/2015 | Nilsson et al. | |

\* cited by examiner

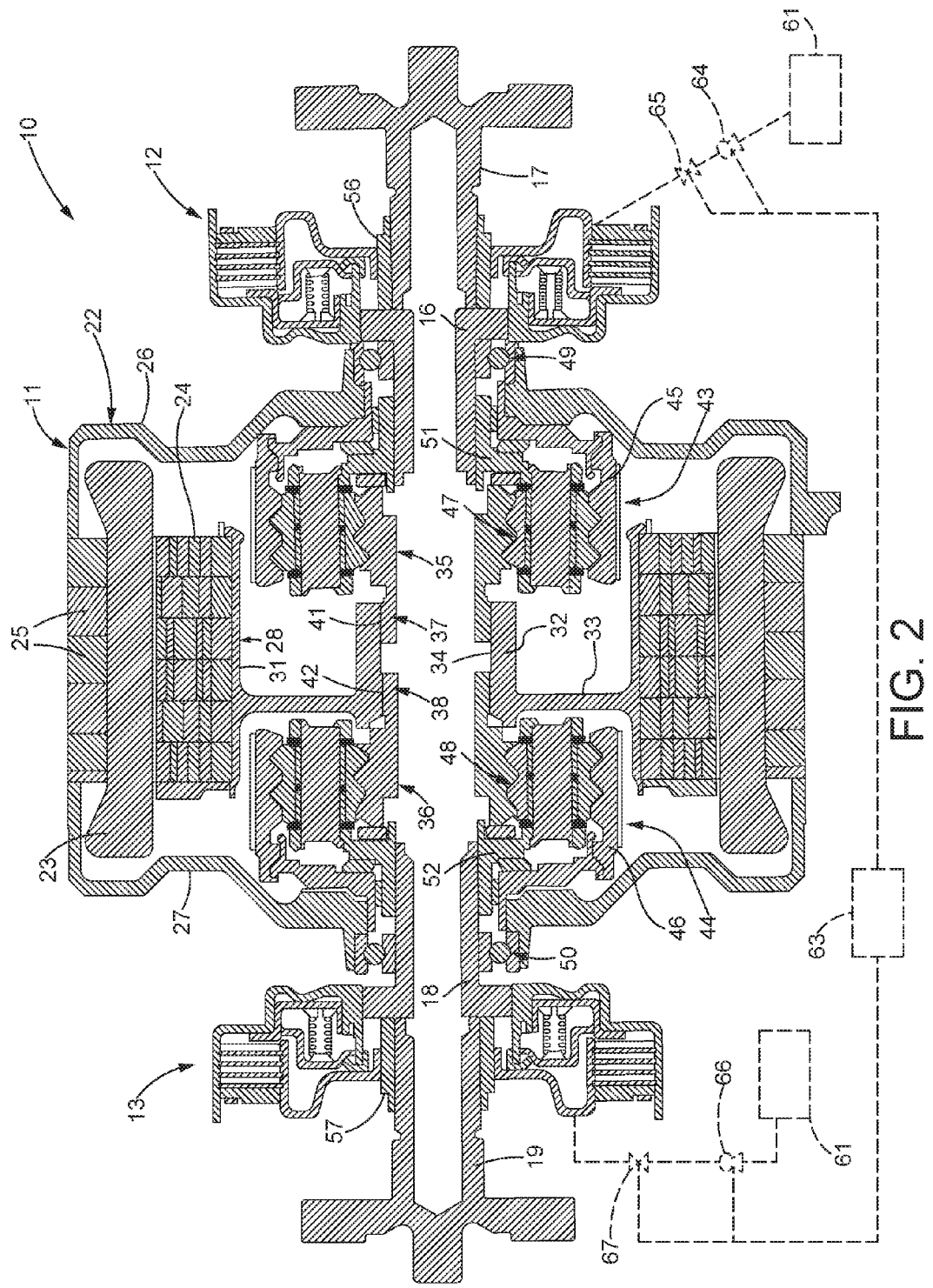

ELECTRIC MOTOR WITH COAXIAL CLUTCH PACKS THAT PROVIDE DIFFERENTIAL AND TORQUE VECTORING

BACKGROUND

Technical Field

This disclosure relates generally to electric motors for powering vehicles. More specifically, this disclosure relates to an electric motor disposed coaxially between a pair of clutch packs. Each clutch pack coaxially connects to and provides differential and torque vectoring to a wheel or traction member.

Description of the Related Art

Motor vehicles have traditionally employed internal combustion (IC) engines with a mechanical or hydraulic transmission system. Hybrid vehicles utilize a combination of an IC engine that powers one axle and an electric motor that powers the other axle. Fully electric cars are now available, some with electric motors mounted perpendicular to the axles, others with electric motors mounted parallel to or coaxially with one or both axles. One advantage of using electric motors for powering vehicles is that there are no combustion products to treat before emission to the atmosphere. Another advantage is that specific types of electric motors can regenerate energy via regenerative braking that provides braking while recharging the power source after release of the accelerator, thereby increasing the overall efficiency of the vehicle.

Vehicles powered by one or more electric motors require a transmission with a complex gear assembly and a differential to achieve the desired output speed and torque levels to each wheel. The differential transfers the motor torque to the wheels. Torque vectoring technology provides the differential with the ability to vary the torque transferred to each wheel. Torque vectoring enhances the ability of the wheels to grip the road for better launch and handling. An electronic slip differential (eLSD) system ensures that each wheel is receiving sufficient torque by use of an electronic control unit. An eLSD system electronically monitors input from various wheel sensors and, in the event of slippage, transfers extra torque to the wheel with the most traction.

However, providing hybrid or electric vehicles with slip differential and/or torque vectoring presents significant packaging problems because there is limited space within the rotor/stator housing of an electric motor. Thus, there is a need for an electric drive system that can provide slip differential and torque vectoring that overcomes these packaging problems.

SUMMARY OF THE DISCLOSURE

One disclosed electric drive system includes an electric motor that, in turn, includes a stator disposed circumferentially around a rotor. The rotor couples to a first sun gear and a second sun gear. The first sun gear meshes with and is disposed coaxially within a first planet gear set. The first planet gear set meshes with and is disposed coaxially within a stationary first ring gear. The second sun gear meshes with and is disposed coaxially within a second planet gear set. The second planet gear set meshes with and is disposed coaxially within a stationary second ring gear. The first planet gear set couples to a first carrier that couples to a first clutch shaft. The first clutch shaft couples to a first clutch pack. The first clutch pack couples to a first output shaft. The first output shaft couples to a first wheel. The second planet gear set couples to a second carrier that couples to a second clutch shaft. The second clutch shaft couples to a second clutch pack. The second clutch pack couples to a second output shaft. The second output shaft couples to a second wheel. The first and second output shafts, the first and second clutch shafts and the first and second sun gears are coaxial.

In one or more embodiments, the electric drive system may also include a stationary housing that surrounds the stator, the rotor and the first and second ring gears. In such an embodiment, the first and second ring gears may couple to the stationary housing.

In one or more embodiments, the first clutch pack may be disposed between the first wheel and the stationary housing and the second clutch pack may be disposed between the second wheel and the stationary housing.

In one or more embodiments, the first clutch pack connects to and is in communication with a fluid supply via a first pump and/or first control valve disposed therebetween. A controller links to the first pump and/or first control valve for controlling the communication between the first clutch pack and the fluid supply. Similarly, the second clutch pack may connect to and be in communication with the fluid supply via a second pump and/or second control valve disposed therebetween. The controller links to the second pump and/or control valve for controlling the communication between the second clutch pack and the fluid supply.

In one or more embodiments, a support frame couples the rotor to the first and second sun gears.

In one or more embodiments, the first and second sun gears each include a splined hub with external splines and the support frame includes at least one splined hub with internal splines for receiving the splined hubs of the first and second sun gears.

In one or more embodiments, the stator connects to the stationary housing.

In another embodiment, an electric drive system includes an electric motor that includes a stator disposed circumferentially around a rotor. The rotor connects to a support frame that extends radially inwards to couple the rotor to a first planetary gear assembly and a second planetary gear assembly. The stator, rotor and first and second planetary gear assemblies are disposed within a stationary housing. The first planetary gear assembly couples to a first clutch shaft, which couples the first planetary gear assembly to a first clutch pack. The first clutch pack couples the first clutch shaft to a first output shaft. The first clutch pack and first output shaft are disposed outside of the stationary housing. The second planetary gear assembly couples to a second clutch shaft, which couples the second planetary gear assembly to a second clutch pack. The second clutch pack couples the second clutch shaft to a second output shaft. The second clutch pack and the second output shaft are also disposed outside of the stationary housing.

In one or more embodiments, the first planetary gear assembly includes a first sun gear disposed within and enmeshed with a first planet gear set that, in turn, is disposed within and enmeshed with a first ring gear. The second planetary gear assembly includes a second sun gear disposed within and enmeshed with a second planet gear set disposed within and enmeshed with a second ring gear. The rotor couples to the first and second sun gears.

In one or more embodiments, the first and second ring gears remain stationary and couple to the stationary housing.

In one or more embodiments, the first planet gear set couples to a first carrier that couples to the first clutch shaft. The first clutch shaft couples the first planet gear set to the first clutch pack. The first clutch pack couples the first clutch shaft to the first output shaft. The first output shaft couples the first clutch pack to a first wheel. Similarly, the second planet gear set couples to a second carrier that couples to the second clutch shaft. The second clutch shaft couples the second planet gear set to the second clutch pack. The second clutch pack couples the second clutch shaft to the second output shaft. The second output shaft couples the second clutch pack to a second wheel.

In one or more embodiments, the first and second output shafts, the first and second clutch shafts and the first and second sun gears are in coaxially alignment.

Another disclosed electric drive system for a hybrid or electric vehicle includes an electric motor including a stator disposed circumferentially around a rotor. The rotor couples to a support frame that couples the rotor to a first sun gear and a second sun gear that are coaxial but spaced apart from one another. The first sun gear meshes with and is disposed coaxially within a first planet gear set. The first planet gear set meshes with and is disposed coaxially within a stationary first ring gear. The second sun gear meshes with and is disposed coaxially within a second planet gear set. The second planet gear set meshes with and is disposed coaxially within a stationary second ring gear. The first planet gear set couples to a first carrier that couples the first planet gear set to a first clutch shaft. The first clutch shaft couples to a first clutch pack that couples the first clutch shaft to a first output shaft. The first output shaft couples the first clutch shaft to a first wheel. The second planet gear set couples to a second carrier that couples the second planet gear set to a second clutch shaft. The second clutch shaft couples to a second clutch pack that couples the second clutch shaft to a second output shaft. The second output shaft couples the second clutch pack to a second wheel. The first and second output shafts, the first and second clutch shafts and the first and second sun gears are coaxial with one another. The electric drive system further includes a stationary housing that surrounds the stator, rotor and the first and second ring gears. The first and second ring gears couple to the stationary housing.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiment illustrated in greater detail on the accompanying drawings, wherein:

FIG. 2 is a sectional view of one embodiment of the drive system illustrated in FIG. 1.

Figure 1:
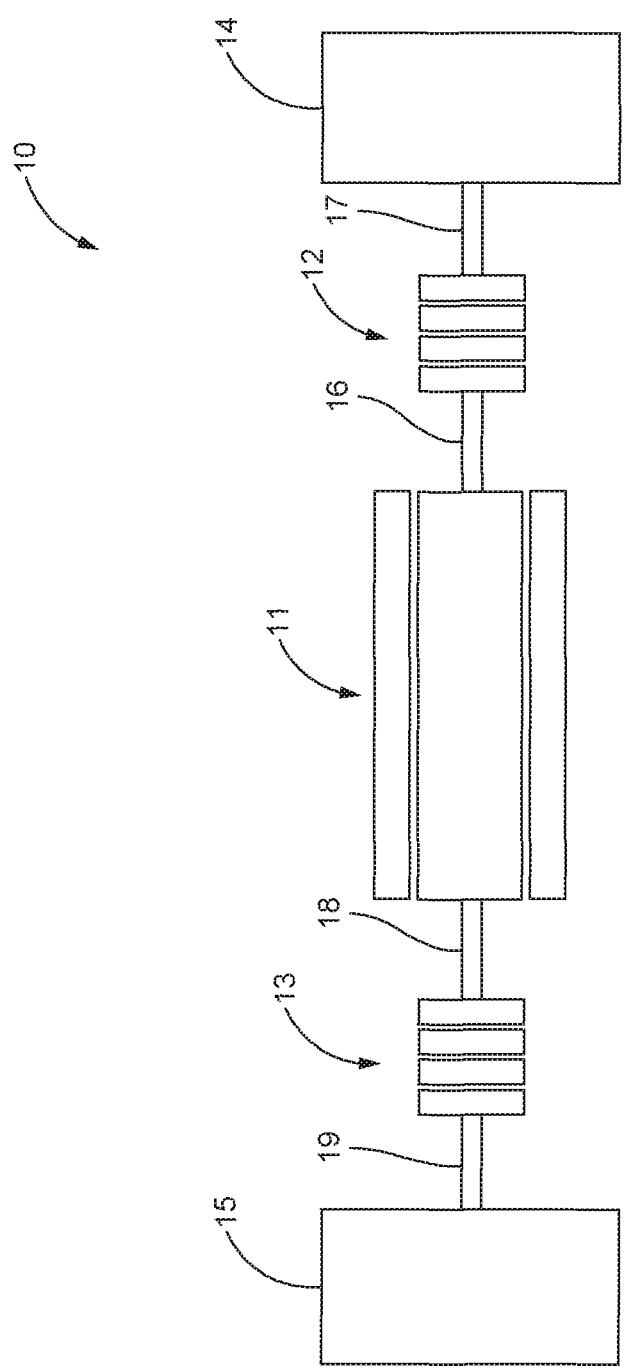
FIG. 1 schematically illustrates a disclosed electric drive system for a vehicle.

The drawings are not necessarily to scale and may illustrate the disclosed embodiments diagrammatically and/or in partial views. In certain instances, the drawings may omit details which are not necessary for an understanding of the disclosed methods and apparatuses or which render other details difficult to perceive. This disclosure is not limited to the particular embodiments illustrated and described herein.

DETAILED DESCRIPTION OF THE PRESENTLY PREFERRED EMBODIMENTS

FIG. 1 illustrates schematically an electric drive system 10 that includes an electric motor 11 coaxially disposed between a first clutch pack 12 and a second clutch pack 13. The first and second clutch packs 12, 13, as well as the electric motor 11, are coaxially disposed between a first traction member or wheel 14 and a second traction member or wheel 15. A first clutch shaft 16 couples the electric motor 11 to the first clutch pack 12 and a first output shaft 17 couples the first clutch pack 12 to the first wheel 14. Meanwhile, a second clutch shaft 18 couples the electric motor 11 to the second clutch pack 13 and a second output shaft 19 couples the second clutch pack 13 to the second wheel 15.

FIG. 2 is a sectional view of one embodiment of the electric drive system 10. A electric motor 11 includes a housing 22 that surrounds a stator 23 that, in turn, surrounds a rotor 24. The rotor 24 rotates within the stator 23, which is stationary and may connect to the housing 22 by one or more support members 25 or, in the example shown in FIG. 2, the housing 22 may include a first half 26 and a second half 27 that are joined together by one or more support members 25. The rotor 24 includes a plurality of magnets mounted on a support frame 28. The support frame 28 may include at least one outer cylindrical member 31 connected to at least one splined hub 32 by an annular wall 33. The splined hub 32 of the support frame 28 includes internal splines 34 that serve to couple the rotor 24 to a first sun gear 35 and a second sun gear 36. More specifically, the first and second sun gears 35, 36 include splined hubs 37, 38 respectively with external splines 41, 42 respectively for coupling the rotor 24 to the first and second sun gears 35, 36 respectively.

The first and second sun gears 35, 36 form parts of first and second planetary gear assemblies 43, 44 respectively. The first planetary gear assembly 43 includes a first ring gear 45 while the second planetary gear assembly 44 includes a second ring gear 46. A first planet gear set 47 is disposed between the first sun gear 35 and the first ring gear 45 and is in meshing engagement with both. Similarly, a second planet gear set 48 is disposed between the second sun gear 36 and the second ring gear 46 and is in meshing engagement with both. The first and second ring gears 45, 46 are stationary and may connect to the housing 22.

The first and second planetary gear assemblies 43, 44 provide speed reduction. More specifically, the first planet gear set 47 connects to a first carrier 51 and the second planet gear set 48 connects to a second carrier 52. The first carrier 51 connects the first planet gear set 47 to a first clutch shaft 16 and the second carrier 52 connects the second planet gear set 48 to a second clutch shaft 18. As the rotor 24 rotates and imparts rotation to the first and second sun gears 35, 36, the output rotational velocity to the first clutch shaft 16 and second clutch shaft 18 is reduced by the first and second planet gear sets 47, 48 as they rotate about the first and second sun gears 35, 36 respectively. Thus, the rotational velocity of the rotor 24 is greater than the rotational velocity of the first and second clutch shafts 16, 18.

The first clutch shaft 16 couples the first carrier 51 to the first clutch pack 12 while the second clutch shaft 18 couples the second carrier 52 to the second clutch pack 13. The first clutch pack 12 couples the first clutch shaft 16 to the first output shaft 17 by way of the splined connector 56 while the second clutch pack 13 couples the second clutch shaft 18 to the second output shaft 19 by way of the splined connector 57.

The first and second clutch packs 12, 13 may provide both differential and torque vectoring functions. More specifically, as shown schematically in FIG. 2, the first clutch and second clutch packs 12, 13 may be in fluid communication with a fluid supply 61. The fluid supply 61 may comprise a common fluid reservoir or separate reservoirs for each clutch pack 12, 13 may be provided. Control of the fluid pressure delivered from the fluid supply 61 to the first and second clutch packs 12, 13 may be controlled in a variety of ways, as will be apparent to those skilled in the art. In the example shown in FIG. 2, a first pump 64 and/or first control valve 65 may be disposed between the fluid supply 61 and the first clutch pack 12. Further, a second pump 66 and/or second control valve 67 may be disposed between the fluid supply 61 and the second clutch pack 13. A controller 63 controls the operation of the first and second pumps 64, 66 and/or first and second control valves 65, 67 as shown schematically in FIG. 2. Thus, the controller 63 operates the first and second clutch packs 12, 13 independently of one another. The controller 63 is programmed with one or more algorithms for operating the first and second clutch packs 12, 13 based on signals received from a variety of sensors (not shown) associated with the rotation of the first and second wheels 14, 15.

INDUSTRIAL APPLICABILITY

The disclosed electric drive system 10 is applicable to both hybrid and fully electric vehicles. The electric drive system 10 provides a compact and coaxially system for transmitting rotational velocity and torque from the rotor 24 of the electric motor 11 to the first and second output shafts 17, 19 while providing both differential and torque vectoring functions through use of the first and second clutch packs 12, 13 disposed outside of the housing 22 of the electric motor 11. Therefore, the disclosed electric drive system 10 with its coaxial components is space efficient and addresses the packaging problems associated with electric drive systems and electric drive axels as discussed above.

While only certain embodiments have been set forth, alternatives and modifications will be apparent from the above description to those skilled in the art. These and other alternatives are considered equivalents and within the spirit and scope of this disclosure and the appended claims.

The invention claimed is:

1. An electric drive system for a vehicle, comprising:
an electric motor including a stator disposed circumferentially around a rotor, the rotor couples to a first sun gear and a second sun gear,
the first sun gear enmeshed with and disposed coaxially within a first planet gear set, the first planet gear set enmeshed with and disposed coaxially within a stationary first ring gear,
the second sun gear enmeshed with and disposed coaxially within a second planet gear set, the second planet gear set enmeshed with and disposed coaxially within a stationary second ring gear,
the first planet gear set couples to a first carrier that couples to a first clutch shaft, the first clutch shaft couples to a first clutch pack, the first clutch pack couples the first clutch shaft to a first output shaft by way of a first splined connector, the first output shaft couples to a first wheel,
the second planet gear set couples to a second carrier that couples to a second clutch shaft, the second clutch shaft couples to a second clutch pack, the second clutch pack couples the second clutch shaft to a second output shaft by way of a second splined connector, the second output shaft couples to a second wheel,
the first and second output shafts, the first and second clutch shafts and the first and second sun gears being coaxial.

2. The electric drive system of claim 1 further comprising a stationary housing that surrounds the stator, the rotor, and the first and second ring gears, the first and second ring gears couple to the stationary housing.

3. The electric drive system of claim 2 wherein the first clutch pack is disposed between the first wheel and the stationary housing and the second clutch pack is disposed between the second wheel and the stationary housing.

4. The electric drive system of claim 2 wherein the stator is connected to the stationary housing.

5. The electric drive system of claim 1 wherein the first clutch pack connects to and is in communication with a first fluid supply, communication between the first clutch pack and first fluid supply being controlled by a controller, and
wherein the second clutch pack connects to and is in communication with a second fluid supply, communication between the second clutch pack and second fluid supply controlled by the controller.

6. The electric drive system of claim 1 wherein a support frame couples the rotor to the first and second sun gears.

7. The electric drive system of claim 6 wherein the first and second sun gears each include a splined hub with external splines and the support frame includes a splined hub with internal splines for receiving the splined hubs of the first and second sun gears.

8. An electric drive system for a vehicle, comprising:
an electric motor including a stator disposed circumferentially around a rotor, the rotor connected to a support frame that extends radially inwards to couple the rotor to a first planetary gear assembly and a second planetary gear assembly, the stator, rotor and first and second planetary gear assemblies disposed within a stationary housing,
the first planetary gear assembly couples to a first clutch shaft that couples the first planetary gear assembly to a first clutch pack, the first clutch pack couples the first clutch shaft to a first output shaft by way of a first splined connector, the first clutch pack and first output shaft disposed outside of the stationary housing,
the second planetary gear assembly couples to a second clutch shaft that couples the second planetary gear assembly to a second clutch pack, the second clutch pack couples the second clutch shaft to a second output shaft by way of a second splined connector, the second clutch pack and second output shaft disposed outside of the stationary housing.

9. The electric drive system of claim 8 wherein the first planetary gear assembly includes a first sun gear disposed within and enmeshed with a first planet gear set disposed within and enmeshed with a first ring gear,
the second planetary gear assembly includes a second sun gear disposed within and enmeshed with a second planet gear set disposed within and enmeshed with a second ring gear,
the rotor couples to the first and second sun gears and the first and second ring gears couple to the stationary housing.

10. The electric drive system of claim 9 wherein the first planet gear set couples to a first carrier that couples to the first clutch shaft, the first clutch shaft couples the first planet gear set to the first clutch pack, the first clutch pack couples the first clutch shaft to the first output shaft, the first output shaft couples the first clutch pack to a first wheel,
the second planet gear set couples to a second carrier that couples to the second clutch shaft, the second clutch shaft couples the second planet gear set to the second clutch pack, the second clutch pack couples the second clutch shaft to the second output shaft, the second output shaft couples the second clutch pack to a second wheel.

11. The electric drive system of claim 10 wherein the first and second output shafts, the first and second clutch shafts and the first and second sun gears are coaxial.

12. The electric drive system of claim 9 wherein the first and second sun gears each include a splined hub with external splines and the support frame includes a spline hub with internal splines for receiving the spline hubs of the first and second sun gears.

13. The electric drive system of claim 8 wherein the first clutch pack connects to and is in communication with a first fluid supply, communication between the first clutch pack and first fluid supply controlled by a controller, and wherein the second clutch pack connects to and is in communication with a second fluid supply, communication between the second clutch pack and second fluid supply controlled by the controller.

14. The electric drive system of claim 8 wherein the stator couples to the stationary housing.

15. An electric drive system for a hybrid or electric vehicle, comprising:

an electric motor including a stator disposed circumferentially around a rotor, the rotor couples to a support frame that couples the rotor to a first sun gear and a second sun gear that are coaxial and spaced apart, the first sun gear is enmeshed with and disposed coaxially within a first planet gear set, the first planet gear set is enmeshed with and disposed coaxially within a stationary first ring gear, the second sun gear is enmeshed with and disposed coaxially within a second planet gear set, the second planet gear set is enmeshed with and disposed coaxially within a stationary second ring gear, the first planet gear set couples to a first carrier that couples to a first clutch shaft, the first clutch shaft couples to a first clutch pack, the first clutch pack couples the first clutch shaft to a first output shaft by way of a first splined connector, the first output shaft couples to a first wheel, the second planet gear set couples to a second carrier that couples to a second clutch shaft, the second clutch shaft couples to a second clutch pack, the second clutch pack couples the second clutch shaft to a second output shaft by way of a second splined connector, the second output shaft couples to a second wheel, the first and second output shafts, the first and second clutch shafts and the first and second sun gears being coaxial, and a stationary housing that surrounds the stator, the rotor, and the first and second ring gears, the first and second ring gears couple to the stationary housing.

* * * * *